United States Patent
Chung

(10) Patent No.: US 6,827,027 B2
(45) Date of Patent: Dec. 7, 2004

(54) EXTENDABLE COUNTER TOP FOR A BARBECUE STAND

(75) Inventor: Kiosky Chung, Taiping (JP)

(73) Assignee: Concept Innovation, Inc., Tortola (VG)

( * ) Notice: Subject to any disclaimer, the term of this patent is extended or adjusted under 35 U.S.C. 154(b) by 103 days.

(21) Appl. No.: 10/295,842

(22) Filed: Nov. 18, 2002

(65) Prior Publication Data

US 2004/0094074 A1 May 20, 2004

(51) Int. Cl.$^7$ .............................................. A47B 13/08
(52) U.S. Cl. ...................................... 108/90; 108/143
(58) Field of Search ...................... 108/90, 26, 152, 108/73, 143, 59, 65, 70; 211/90.02, 175; 126/25 R, 9 R, 9 B; 312/140.1, 140.2, 140.3

(56) References Cited

U.S. PATENT DOCUMENTS

| | | | | |
|---|---|---|---|---|
| 2,139,140 A | * | 12/1938 | Viehmann | 108/74 |
| 2,556,943 A | * | 6/1951 | Reisman | 108/90 |
| 2,572,333 A | * | 10/1951 | Greitzer | 108/90 |
| 4,227,467 A | * | 10/1980 | Kindsfather | 108/101 |
| 4,938,441 A | * | 7/1990 | Hannah et al. | 248/248 |
| 5,681,116 A | * | 10/1997 | Lin | 384/42 |

FOREIGN PATENT DOCUMENTS

DE          3510338       *  4/1986

* cited by examiner

*Primary Examiner*—José V. Chen
(74) *Attorney, Agent, or Firm*—Fei-Fei Chao; Bingham McCutchen LLP

(57) ABSTRACT

An extendable counter top (20) for a barbecue stand (10) is composed of a moveable counter top (30) and a stationary counter top (40). The moveable counter top (30) slidably covers the stationary counter top (40) by means of tracks and rails. The counter top (20) is extendable to enlarge its area to support more objects both on the moveable counter top (30) and the stationary counter top (40). Additionally, a positioning device is further attached between the moveable counter top (30) and the stationary counter top (40) to detachably lock the moveable counter top (30) relative to the stationary counter top (40).

3 Claims, 6 Drawing Sheets

EXTENDABLE COUNTER TOP FOR A BARBECUE STAND

BACKGROUND OF THE INVENTION

1. Field of the Invention

The present invention relates to a counter top attached to a barbecue stand, and more particularly to an extendable counter top, which increases the useable area of the counter top.

2. Description of Related Art

A stand supports an object like a barbecue grill, a roaster, a smoker, a water basin or the like to elevate the object to a position where a person can easily use the object. A conventional barbecue stand usually has multiple counter tops attached on sides of the barbecue stand to place food, dishes, barbecue tools, etc. Some barbecue stands even have a cooking element mounted in the counter top to simultaneously cook or warm other items or dishes. However, when a cooking element is mounted in the counter top, the counter top cannot be used to hold many other objects. Therefore, the counter top cannot have a cooking element and still be used to effectively support barbecue tools, condiments, etc.

To overcome the shortcomings of the conventional counter top for a barbecue stand, the present invention provides an extendable counter top to mitigate and obviate the aforementioned problems.

SUMMARY OF THE INVENTION

A first objective of the invention is to provide an extendable counter top for a barbecue stand that can enlarge the area of the counter top.

Other objects, advantages and novel features of the invention will become more apparent from the following detailed description when taken in conjunction with the accompanying drawings.

DETAILED DESCRIPTION OF THE PREFERRED EMBODIMENT

Figure 1:
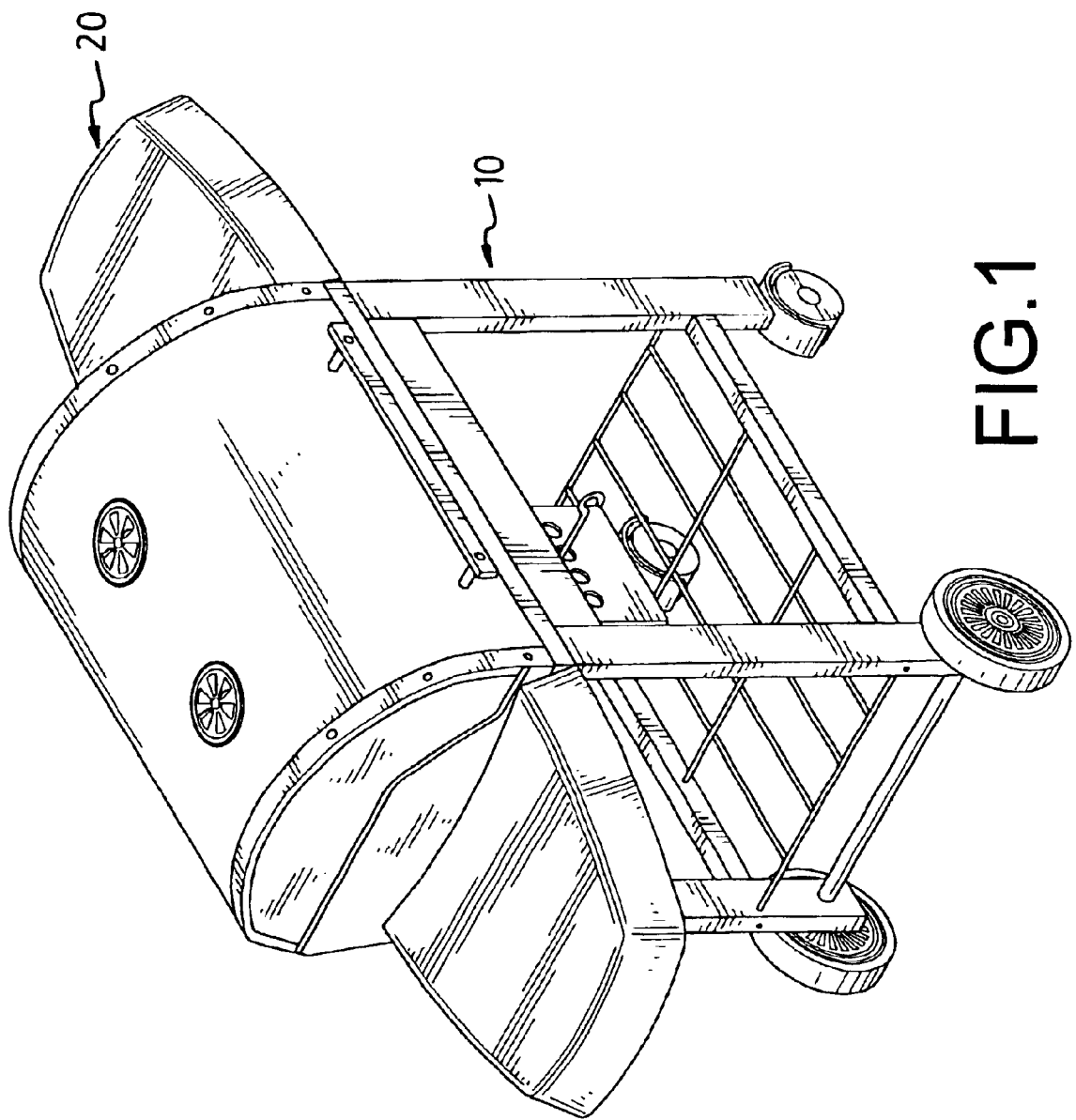
FIG. 1 is a perspective view of two extendable counter tops attached to a barbecue stand in accordance with the present invention.
Figure 2:
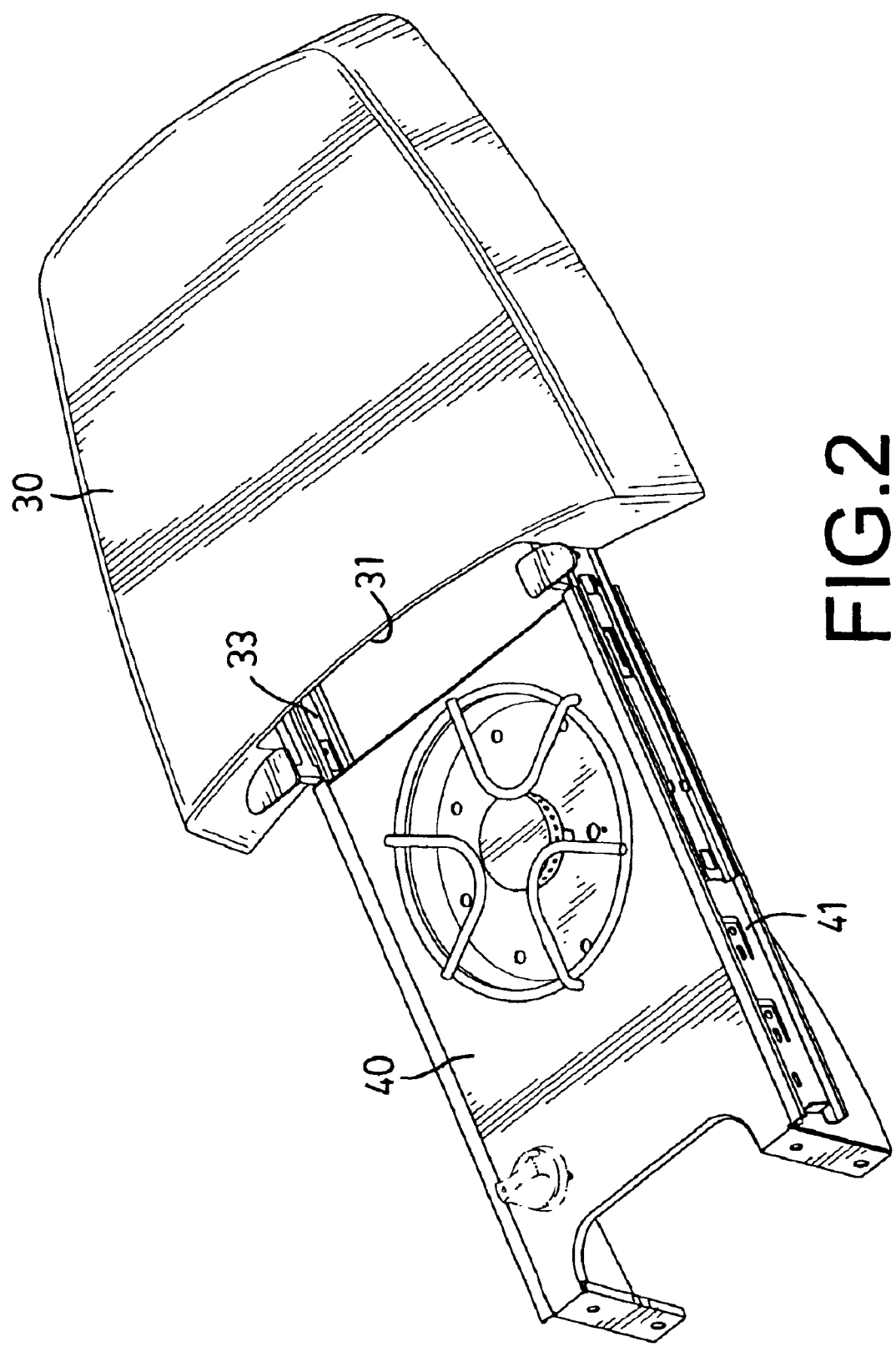
FIG. 2 is an enlarged perspective view of an extendable counter top in FIG. 1 with the counter top extended.

With reference to FIGS. 1 and 2, an extendable counter top (20) attached to a barbecue stand (10) comprises a moveable counter top (30), a stationary counter top (40) and a positioning device mounted between the moveable counter top (30) and the stationary counter top (40).

The moveable counter top (30) has a flat top, a bottom, a front edge, a rear edge, a distal end and a proximal end and has a recess (31) on the bottom. The recess (31) is open on the proximal end, has two rails (33), an interior front wall, an interior rear wall and an interior end wall and houses the stationary counter top (40). The rails (33) are attached respectively to the interior front wall and the interior rear wall.

The stationary counter top (40) is a flat plate corresponding to the recess (31) in the moveable counter top (30) and is adapted to attach to the barbecue stand (10). The stationary counter top (40) has a front edge, a rear edge, a proximal edge, a distal edge and two tracks (41). The tracks (41) are mounted respectively on the front edge and the rear edge to engage the rail (33) of the moveable counter top (30).

Figure 3:
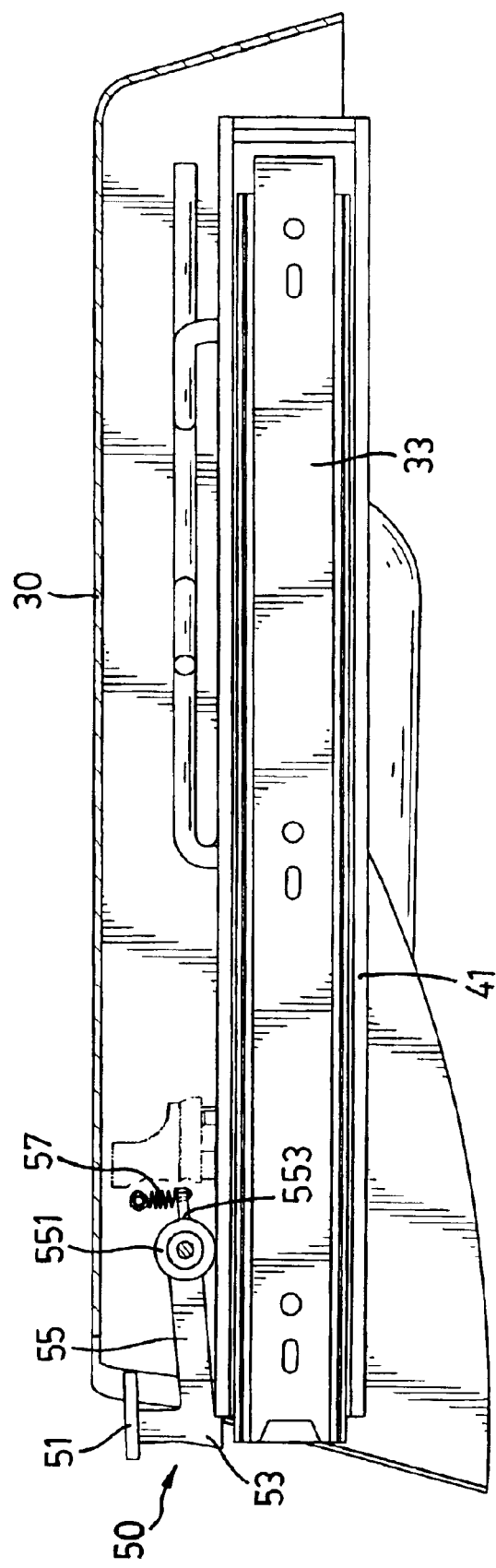
FIG. 3 is an enlarged cross-sectional front plan view of the extendable counter top in FIG. 1 with the extendable counter top closed.
Figure 4:
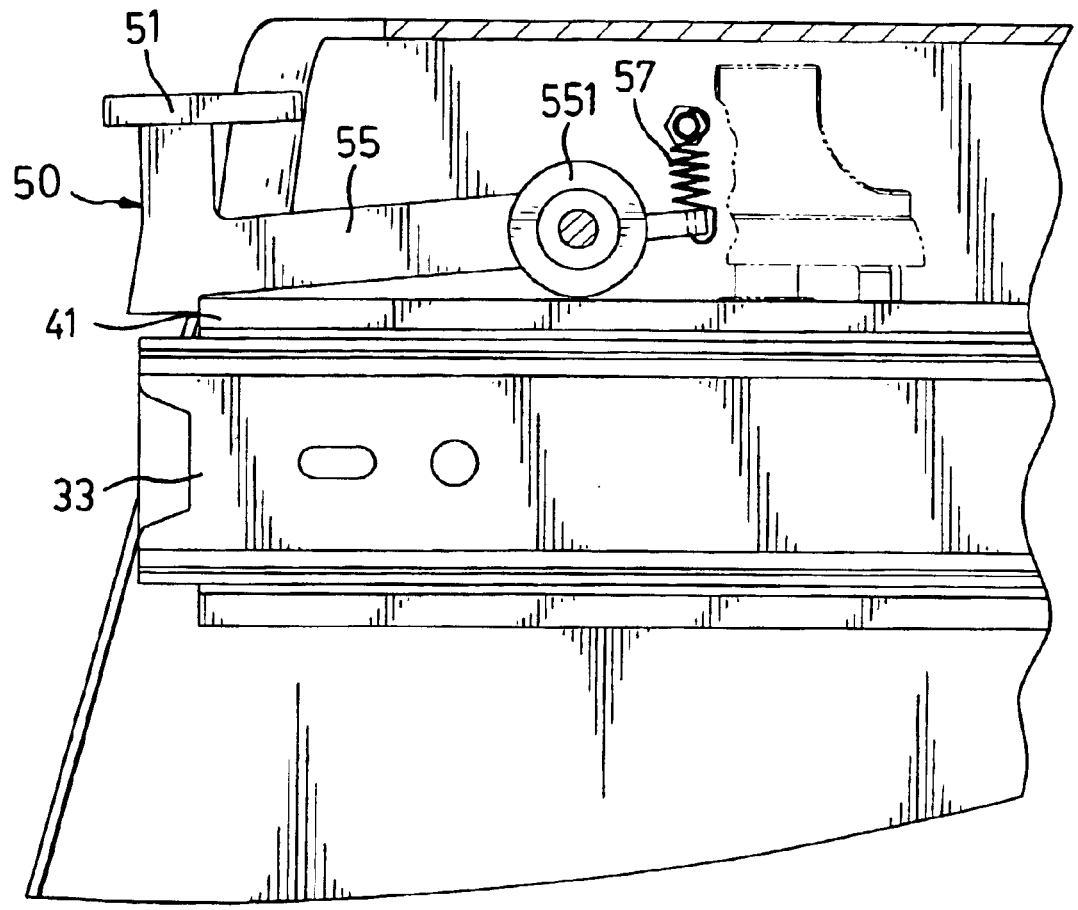
FIG. 4 is an enlarged cross-sectional front plan view of the extendable counter top in FIG. 3.

With reference to FIGS. 3 and 4, the positioning device is constructed between the moveable counter top (30) and the stationary counter top (40) to selectively release the moveable counter top (30) from the stationary counter top (40) or lock it in position relative to the stationary counter top (40). The positioning device is composed of a latch (50) and a resilient element. The latch (50) is pivotally mounted inside the recess (31) of the moveable counter top (30) near proximal end of the movable counter top (30). The latch (50) is a T-shaped frame with a vertical cross member, a horizontal leg (55) and an enlarged head (51). The vertical cross member has an upper end and a lower end. The enlarged head (51) is formed on the upper end of the vertical cross member and partially extends out from the moveable counter top (30) so a person can release the latch (50). The lower end of the vertical cross member forms a stop (53). The stop (53) hooks a distal end of the track (41) close to the barbecue stand when the moveable counter top (30) covers the stationary counter top (40) inside the recess (31). The horizontal leg (55) extends into the recess (31), and a pivot (551) is formed on a free end of the horizontal leg (55) to pivotally attach to the moveable counter top (30). The horizontal leg (55) further has a connecting rod (553) extending to and firmly combining with the resilient element. The resilient element is a spring (57) that provides a biasing force on the latch (50) to make the stop (53) abut the track (41).

Figure 5:
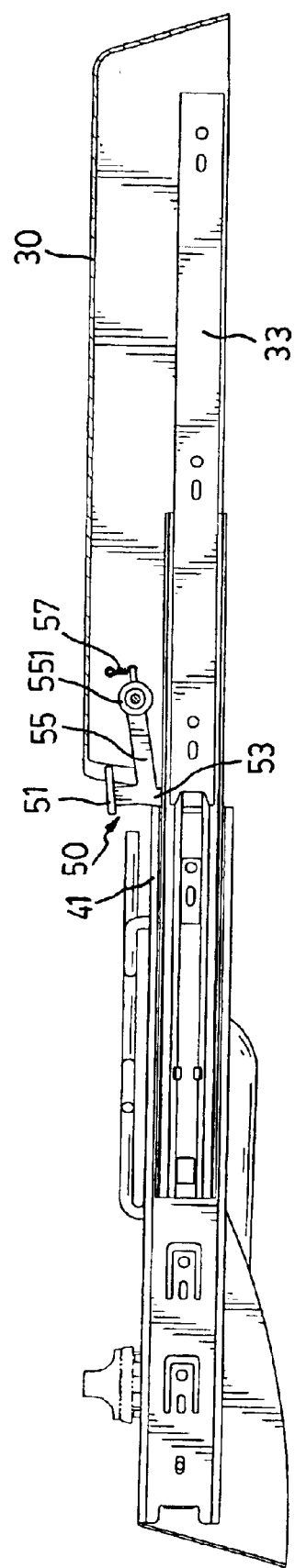
FIG. 5 is an enlarged cross-sectional front plan view of the extendable counter top in FIG. 2 with the extendable counter top extended.
Figure 6:
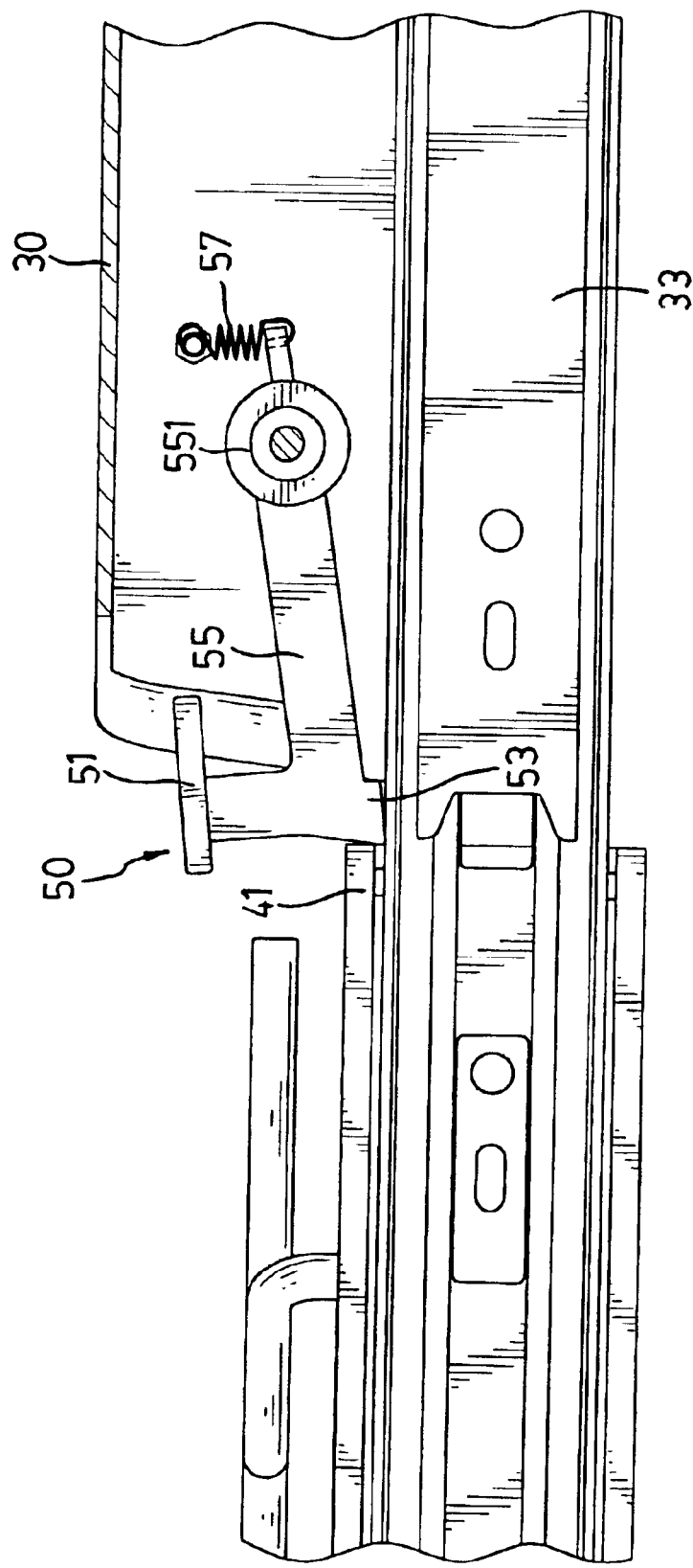
FIG. 6 is an enlarged cross-sectional front plan view of the extendable counter top in FIG. 5.

With reference to FIGS. 5 and 6, when the moveable counter top (30) opens, the enlarged head (51) of the latch (50) is pulled up to release the stop (53) from the proximal end of the track (41). Then the rail (33) freely slides along the track (41) to extend the counter top (20) until the counter top (20) is fully extended. When the latch (50) arrives at the distal end of the track (41), the enlarged head (51) is released and the stop (53) blocks the track (41) to hold the moveable counter top (30) at a fully extended position. With the extendable counter top (20) extended, the available useful area is significantly increased, especially when there is a cooking element mounted in the stationary counter top (40). Additionally, the moveable counter top (30) also provides a protective cover for the cooking element and makes the barbecue stand (10) appear neat.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An extendable counter top (20) adapted to be attached to a barbecue stand (10), which comprising:

a moveable counter top (30) with a flat top, a bottom, a front edge, a rear edge, a distal end and a proximal end having a recess (31) defined in the bottom of the moveable counter top (30);

a stationary counter top (40) adapted to attach to the barbecue stand (10) having a front edge, a rear edge, a proximal end and a distal end and mounted in the recess (31);

two rails (33) and tracks (41) mounted respectively on the front and rear edges of the moveable counter top (30) and the stationary counter top (40) to make the counter top (30) extendable; and two positioning devices mounted on the moveable counter top (30) to selectively latch a proximal end or a distal end of each corresponding track (41) to firmly hold the moveable counter top (30) in an open or closed position respectively;

wherein each positioning device is a T-shaped latch (50) with a vertical cross member with an upper end and a lower end, a horizontal leg (55) laterally extending from the vertical cross member and pivotally attached to the moveable counter top (30), an enlarged head (51) formed on the upper end of the vertical cross member and a stop (53) formed on the lower end of the vertical cross member;

wherein the enlarged head (51) partially extends out from the moveable counter top (30) to facilitate the release the latch (50);

wherein when the moveable counter top (30) opens, the enlarged head (51) of the latch (50) is culled up to release the stop (53) from the proximal end of the track (41) to allow the rail (33) to freely slide along the track (41) to extend the counter top (20) to an extended position;

wherein when the latch (50) arrives at the extended position and/or at the distal end of the track (41), the enlarged head (51) is released and the stop (53) blocks the track (41) to firmly hold the moveable counter top (30) at the extended position and/or a fully extended position.

2. The extendable counter top as claimed in claim 1, wherein the positioning device further has a resilient element attached to the latch (50) to provide a biasing force to make the latch (50) press against the track (41).

3. The extendable counter top as claimed in claim 2, wherein the resilient element is a spring (57).

* * * * *